United States Patent
Kosugi (10) Patent No.: US 6,535,740 B1
(45) Date of Patent: Mar. 18, 2003

(54) SYSTEM AND METHOD OF CONTROLLING TRANSMISSION ELECTRIC POWER IN A CDMA BASE STATION

(75) Inventor: Junichi Kosugi, Saitama (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/436,246

(22) Filed: Nov. 9, 1999

(30) Foreign Application Priority Data

Nov. 9, 1998 (JP) .......................................... 10-318167

(51) Int. Cl.[7] ................................................ H04Q 7/20
(52) U.S. Cl. ........................ 455/442; 455/437; 370/331; 370/332
(58) Field of Search ................................ 455/436, 437, 455/442, 418, 67.1, 561, 522; 370/331, 332, 335

(56) References Cited

U.S. PATENT DOCUMENTS 5,267,261 A * 11/1993 Blakeney, II et al. ....... 370/332
5,584,049 A * 12/1996 Weaver, Jr. et al. ........ 455/67.1
5,850,607 A * 12/1998 Muszynski .................. 455/442
5,901,354 A * 5/1999 Menich et al. .............. 455/442
6,055,428 A * 4/2000 Soliman ...................... 455/437
6,223,056 B1 * 4/2001 Appel ......................... 455/561
6,226,502 B1 * 5/2001 Chung ........................ 455/118

FOREIGN PATENT DOCUMENTS

JP          9-326754         12/1997
JP          10-145834        5/1998

* cited by examiner

*Primary Examiner*—Quochien Vuong
(74) *Attorney, Agent, or Firm*—Foley & Lardner (57) ABSTRACT

When a base station stops transmission due to its maintenance, transmission electric power of the base station is controlled so that a radio network between a mobile station and a selected one of the mobile station and the neighboring stations may not be disconnected. The base station gradually reduces the level of transmission electric power. Until the transmission completely stops, soft handoff deletion procedure between the base station and the mobile station is performed and soft handoff addition procedure between one of the neighboring base stations and the mobile station is performed.

20 Claims, 7 Drawing Sheets

SYSTEM AND METHOD OF CONTROLLING TRANSMISSION ELECTRIC POWER IN A CDMA BASE STATION

BACKGROUND OF THE INVENTION

1. Field of the Invention

The invention relates to a system and a method of controlling transmission electric power in a base station used in a CDMA (Code Division Multiple Access) system.

2. Description of the Related Art

In the past, a CDMA system for cellular mobile communication has been controlled based on the standard IS-95-A of TIA/EAI (Telecommunication on Industry Association/ Electronic Industry Association).

In the CDMA system, since a plurality of mobile stations use the same frequency band in common, it is necessary to decrease an interference of electric power between the mobile stations and to increase the number of the mobile stations, which enable multiple access.

To this end, transmission electric power must be accurately controlled in each base station to a proper value. In this case, the proper value of the transmission electric power is usually selected such that a data error rate falls within an allowable range at a minimum value of the transmission electric power when a base station receives a signal from a mobile station. That is, the electric power received by the base station or desired-to-undesired signal ratio (SIR) determined from the received electric power is uniformly controlled regardless of a location of the mobile station.

Also, the mobile station which is busy may communicate with a plurality of base stations through the same frequency band without any interruption of communication by repeating soft handoff (or softer hand handoff) to smoothly change the base stations from one to another. Herein, the mobile station always receives pilot signals from a base station which currently communicates with and the neighboring base stations, in order to add a new base station as an object of soft handoff or delete the base station as an object of soft handoff. Then, from electric field strength of the received pilot signal, received desired signal energy-to-whole received energy ratio (Ec/Io ratio) is measured, and the measured ratio is compared with a threshold value which is given as a reference value which is determined in relation to addition of an object of soft handoff or which is determined in relation to deletion of the object of soft handoff. For example, when an Ec/Io ratio of pilot signal from a base station exceeds a threshold value T-ADD, soft handoff addition procedure is performed.

Herein, it often happens that a base station stops transmission, for example, to maintain or to check over a CDMA communication system. In such a case, since the pilot signal from the base station is rapidly stopped, a mobile station which communicates in a service area with the stopped base station and the neighboring base stations must quickly perform the soft handoff addition procedure for the neighboring base stations.

In the procedure, it is required to transmit messages between the mobile station and the base station with which the mobile station communicates.

Techniques related to soft handoff in the CDMA communication system are disclosed, for example, in Japanese Laid-Open Publications No. H09-326754 (namely, 326754/ 1997) and No. H10-145834 (namely, 145834/1998).

However, no consideration is made at all in the above-mentioned techniques about the fact that each base station is interrupted or stopped for maintaining the base station and about the problem resulting from such an interruption of each base station.

In fact, when a base station which is communicating with mobile stations stops transmission suddenly, a call disconnection inevitably takes place during communication in a radio link or channel between the base station and the mobile stations which are communicating in a service area with the base station.

SUMMARY OF THE INVENTION

Therefore, it is an object of the invention to provide a device and a method of preventing occurrence of disconnection of a radio network between mobile stations and base stations (a base station and the neighboring base stations) when the base station stops transmission in maintaining of itself.

To prevent the disconnection, the method of the invention reduces transmission electric power of the base station gradually in stopping transmission of the base station due to its maintenance, and performs soft handoff deletion procedure for the base station to be stopped and soft handoff addition procedure for a new base station, until transmission is completely stopped. Namely, a duration time from a start of the reduction of the electric power to a stop of transmission is desirably controlled less than a period of execution time of the soft handoff addition procedure and the soft handoff deletion procedure.

According to a first embodiment of the invention, a method of controlling transmission electric power in a first base station communicating with a mobile station is provided. The method comprises the steps of gradually reducing the transmission electric power and consequently stopping transmission in the first base station, and performing soft handoff deletion procedure for the first base station and soft handoff addition procedure for second base stations without disconnection between the mobile station and selected one of the first base station and the second base stations.

According to a second embodiment of the invention, a control system which controls transmission electric power is provided. The system comprises a first base station which gradually reduces transmission electric power of itself and consequently stops transmission, and a mobile station which communicates with the first base station and performs soft handoff deletion procedure for the first base station and soft handoff addition procedure for second base stations without disconnection between the mobile station and selected one of the first base station and the second base stations.

According to a third embodiment of the invention, a base station comprises a control unit which controls to gradually reduce transmission electric power of itself and consequently stop transmission, and a sending unit which sends a signal based on electric power which is controlled by the control unit.

According to a fourth embodiment of the invention, a computer readable medium which stores a program operable for controlling transmission electric power in a first base station communicating with a mobile station is provided. The program comprises the steps of gradually reducing transmission electric power and consequently stopping transmission in the first base station, and performing soft handoff deletion procedure for the first base station and soft handoff addition procedure for second base stations without disconnection of radio networks between the mobile station and selected one of the first base station and the second base stations.

DESCRIPTION OF THE PREFERRED EMBODIMENT

At first, a previous technique is described with reference to FIGS. 1 to 4. In a soft handoff addition procedure shown in FIG. 1, a mobile station sends to a base station a message for measuring reception field strength of pilot signals to initiate soft handoff. Responsive to the message, the base station sends an instruction message for instructing soft handoff to the mobile station. Supplied with the instruction message, the mobile station sends a soft handoff completion message to the base station.

In this case, it is to be noted that the soft handoff includes soft handoff addition procedure and soft handoff deletion procedure and that the soft handoff addition procedure is performed only between the mobile station and the base station which is communicating with the mobile station.

The CDMA communication system using the above technique may stop transmitting data to maintain itself.

In such a case, since pilot signals from the base station are stopped, the soft handoff addition procedure is performed between mobile stations communicating with the stopped base station and at least one of the neighboring base stations.

Figure 1:
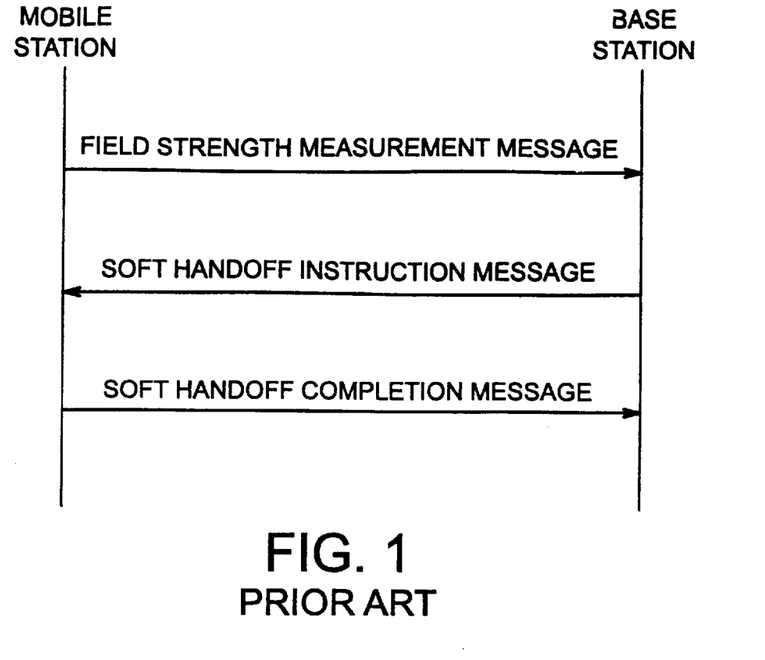
FIG. 1 shows a sequence of soft handoff addition procedure in a previous art.

In the soft handoff addition procedure, it is required to transmit messages between the mobile station and the base station with which the mobile station communicates, as mentioned in conjunction with FIG. 1. However, when the base station abruptly stops transmission for maintenance of the base station, the mobile station is transiently disconnected from a radio network between the mobile station and, as a result, a call disconnection or interruption undesirably takes place.

Figure 2:
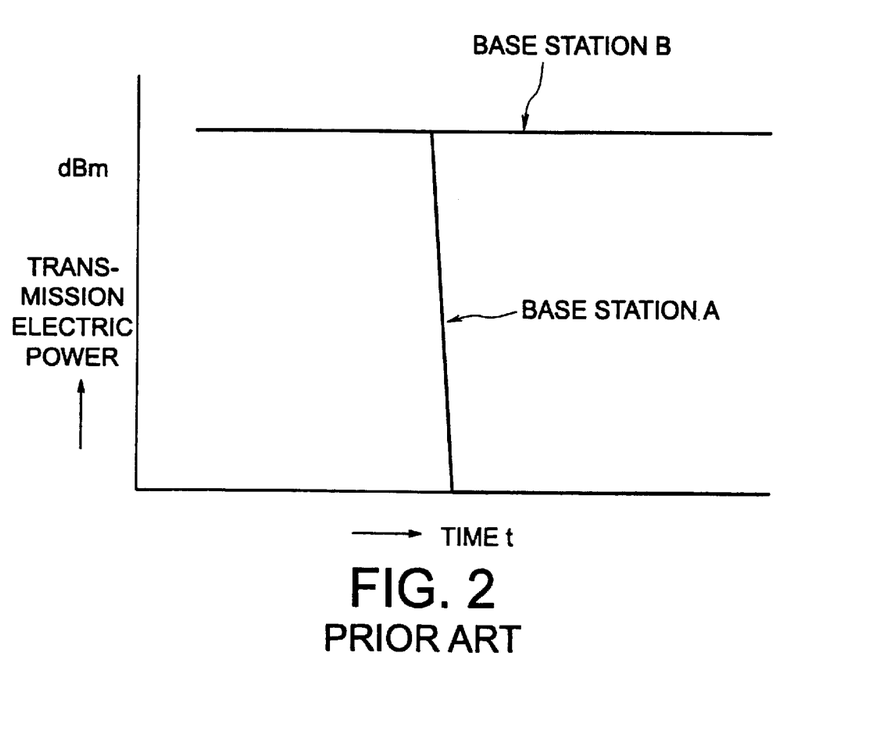
FIG. 2 shows transitions of transmission electric power of base stations in a previous art.
Figure 3:
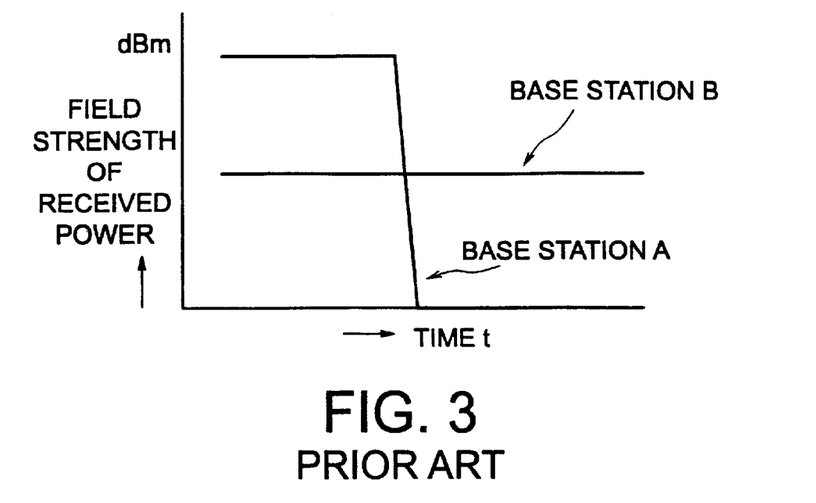
FIG. 3 shows transitions of electric field strength received at a mobile station from base stations in a previous art.
Figure 4:
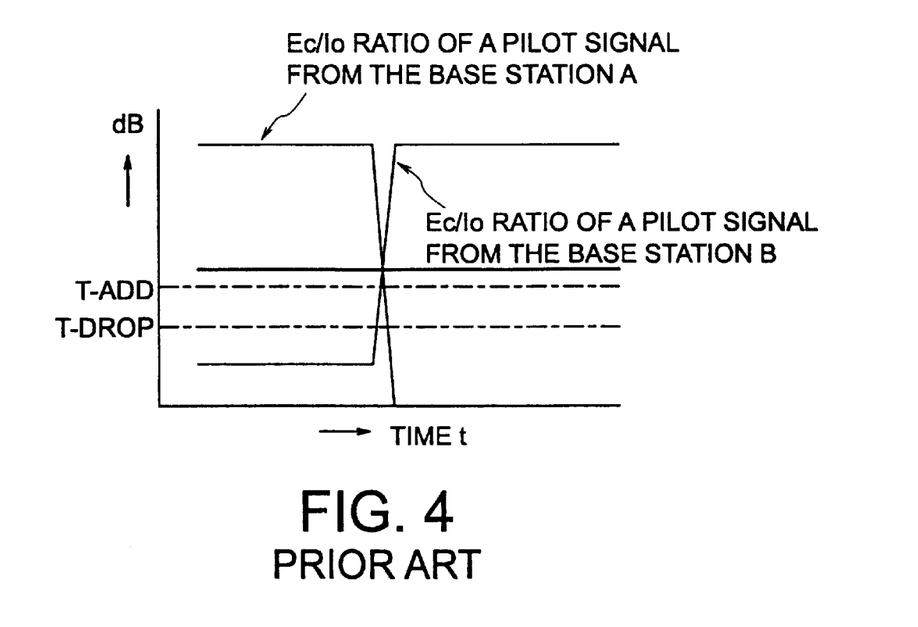
FIG. 4 shows Ec/Io ratios of pilot signals received at a mobile station from base stations in a previous art.

When transmission of a pilot signal is stopped at a base station due to its maintenance, for example, when the base station A suddenly stops transmission and transmission power of the base station is abruptly decreased to zero as shown in FIG. 2, electric field strength received by a mobile station from the base station A is suddenly reduced as shown in FIG. 3. As a result, an Ec/Io ratio of the pilot signal of the base station A instantaneously drops down under a threshold value T-DROP, for determining whether soft handoff deletion procedure should be performed or not, as shown in FIG. 4.

Simultaneously, an Ec/Io ratio of the pilot signal of the base station B exceeds a threshold value T-ADD for determining whether soft handoff addition procedure should be performed or not. However, as described with reference to FIG. 1, the soft handoff addition procedure needs to communicate with the base station A with which the mobile station currently communicates. When transmission is stopped at the base station A, the mobile station may not receive any control signal from the base station A and is then disconnected from a radio network to cause a call disconnection to occur.

Therefore, a device and a method of controlling transmission electric power in a CDMA base station of the invention are provided to prevent such a disconnection of a radio network.

Next, a configuration of an embodiment of the invention is described with reference to FIG. 5.

Figure 5:
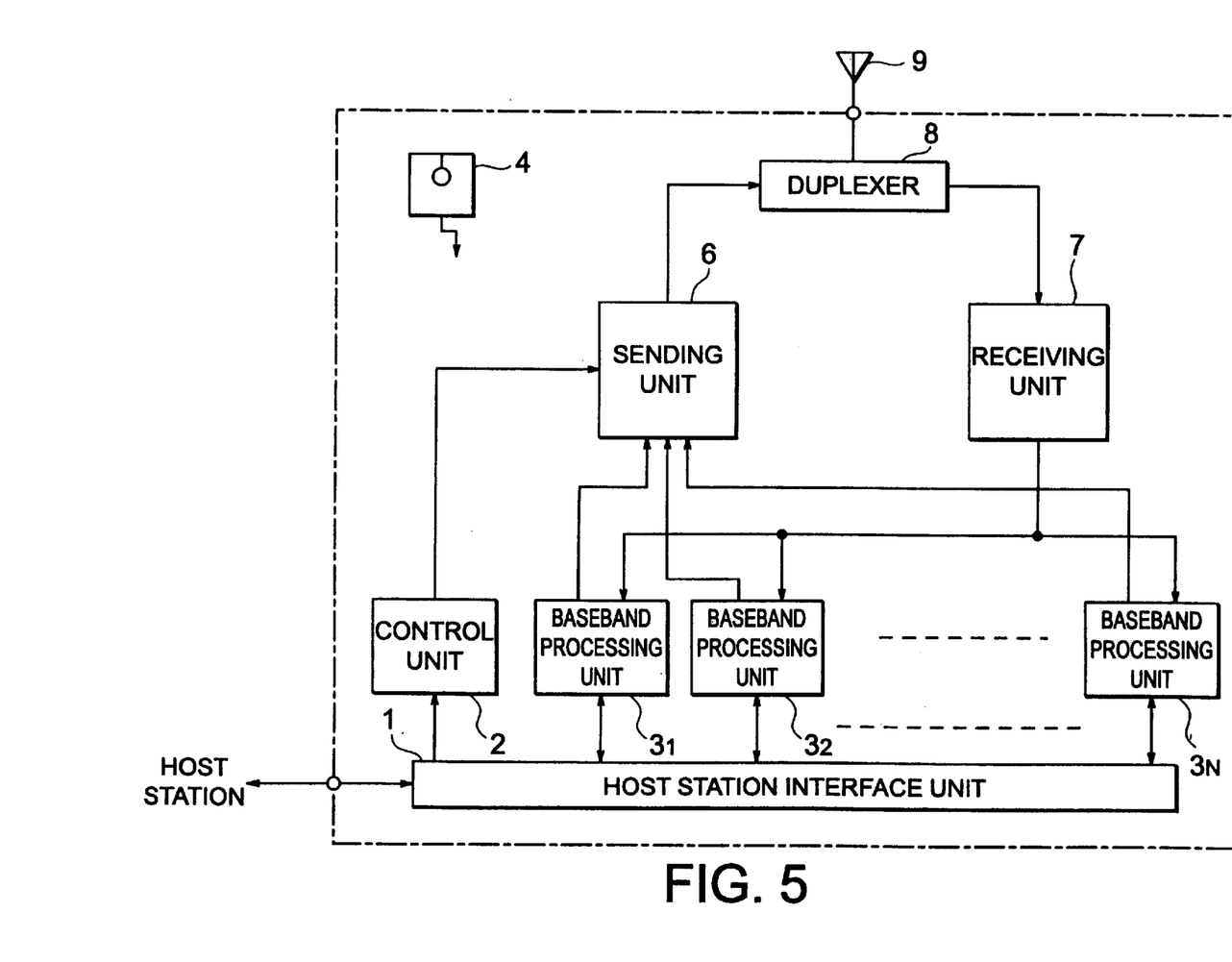
FIG. 5 shows a block diagram representing a configuration of an embodiment of the present invention.

A CDMA base station shown in FIG. 5 includes a host station interface unit 1, a control unit 2, a plurality of baseband processing units $3_1, 3_2, \ldots, 3_N$. The host station interface unit 1 interfaces with a host station. The illustrated control unit 2 is operable to control transmission electric power when the base station is under maintenance. Each baseband processing unit sends, to a sending unit 6, a primary modulated signal which is produced by primary modulated data sent from the host station interface unit 1 and obtained by modulating a carrier. In addition, each baseband processing unit provides receiving data which is produced from primary demodulated signal sent from a receiving unit 7.

The sending unit 6 actually controls (gradually reduces) transmission electric power (in a stepwise or a continuous manner) based on the instruction given from the control unit 2 when the CDMA base station is under maintenance.

The receiving unit 7 receives signal sent from mobile stations (not shown), detects correlation by using reference spread code signal to produce despread signals, and provides a desired primary demodulated signal from the despread signals.

Further, the CDMA base station includes a duplexer 8 which sends signal to an antenna 9 with transmission electric power from the sending unit 6 and sends, to the receiving unit 7, a reception signal given from the antenna 9.

Also, the elements in the CDMA base station shown in FIG. 5 are controlled by a program. The program is given via a computer readable medium 4, such as a floppy disk and a CD-ROM, to the base station.

Figure 6:
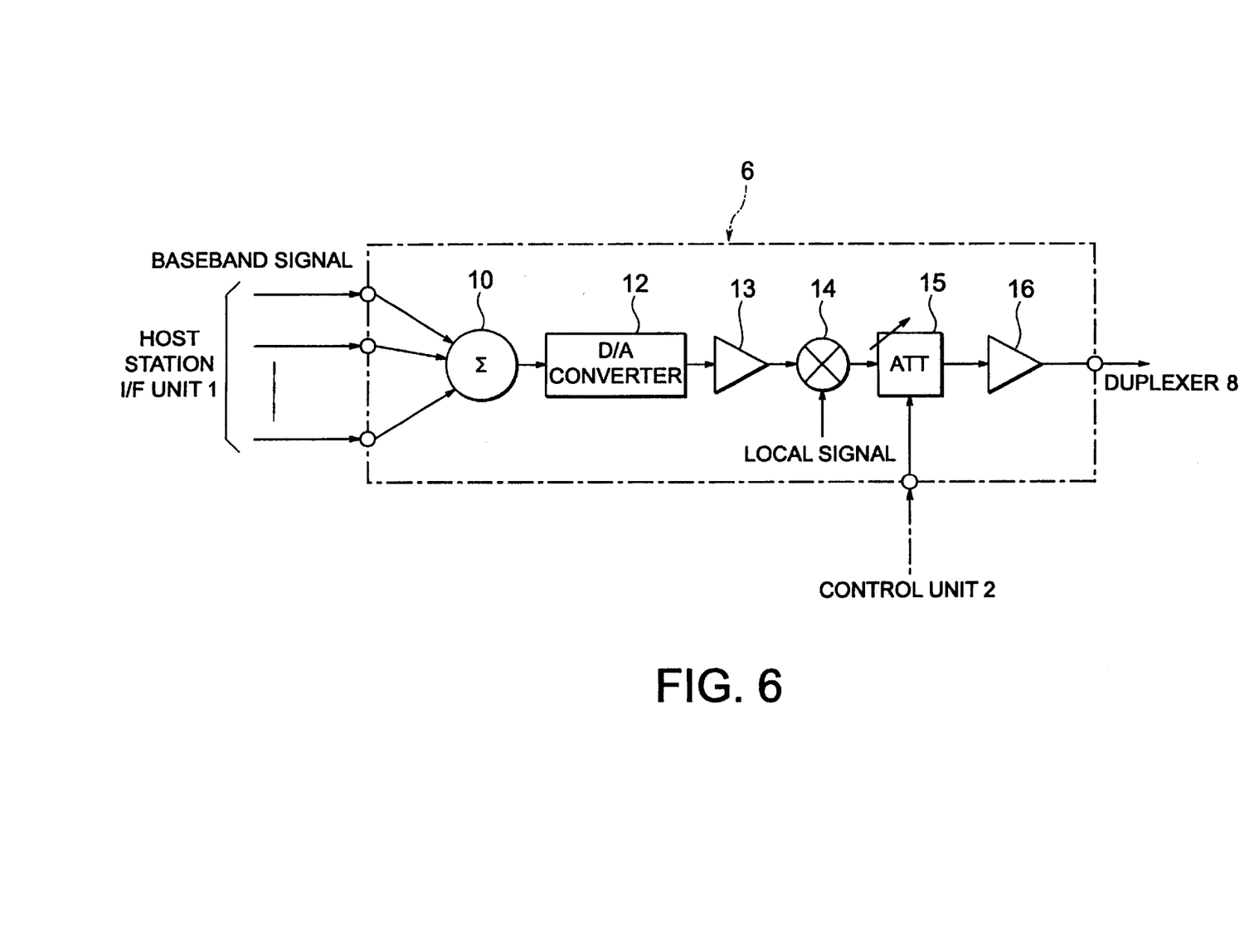
FIG. 6 shows a detailed configuration of an example of a sending unit shown in FIG. 5.

In FIG. 6, the sending unit 6 shown in FIG. 5 is shown in more detail. The sending unit 6 includes an adder 10, a D/A converter 12, an amplifier 13, a modulator 14, a variable attenuator 15, and a power amplifier 16.

The adder 10 sums up a plurality of primary modulated signals sent as baseband signals from the base band processing units $3_1, 3_2, \ldots, 3_N$. As a result, the adder 10 produces a sum signal obtained by summing up the baseband signals. The D/A converter 12 converts the sum signal sent from the adder 10 into an analog signal. The amplifier 13 amplifies the analog signal sent from the D/A converter 12 into an amplified sum signal. The modulator 14 mixes the amplified sum signal with a local signal (which may be practically a spread code signal) to produce a spread signal. The variable attenuator 15 gradually controls or attenuates the level of electric power of the spread signal sent from the modulator 14 based on the control signal sent from the control unit 2 (in a stepwise or a continuous manner). The power amplifier 16 amplifies electric power of the controlled spread signal to a predetermined level and sends the same to the duplexer 8.

Figure 7:
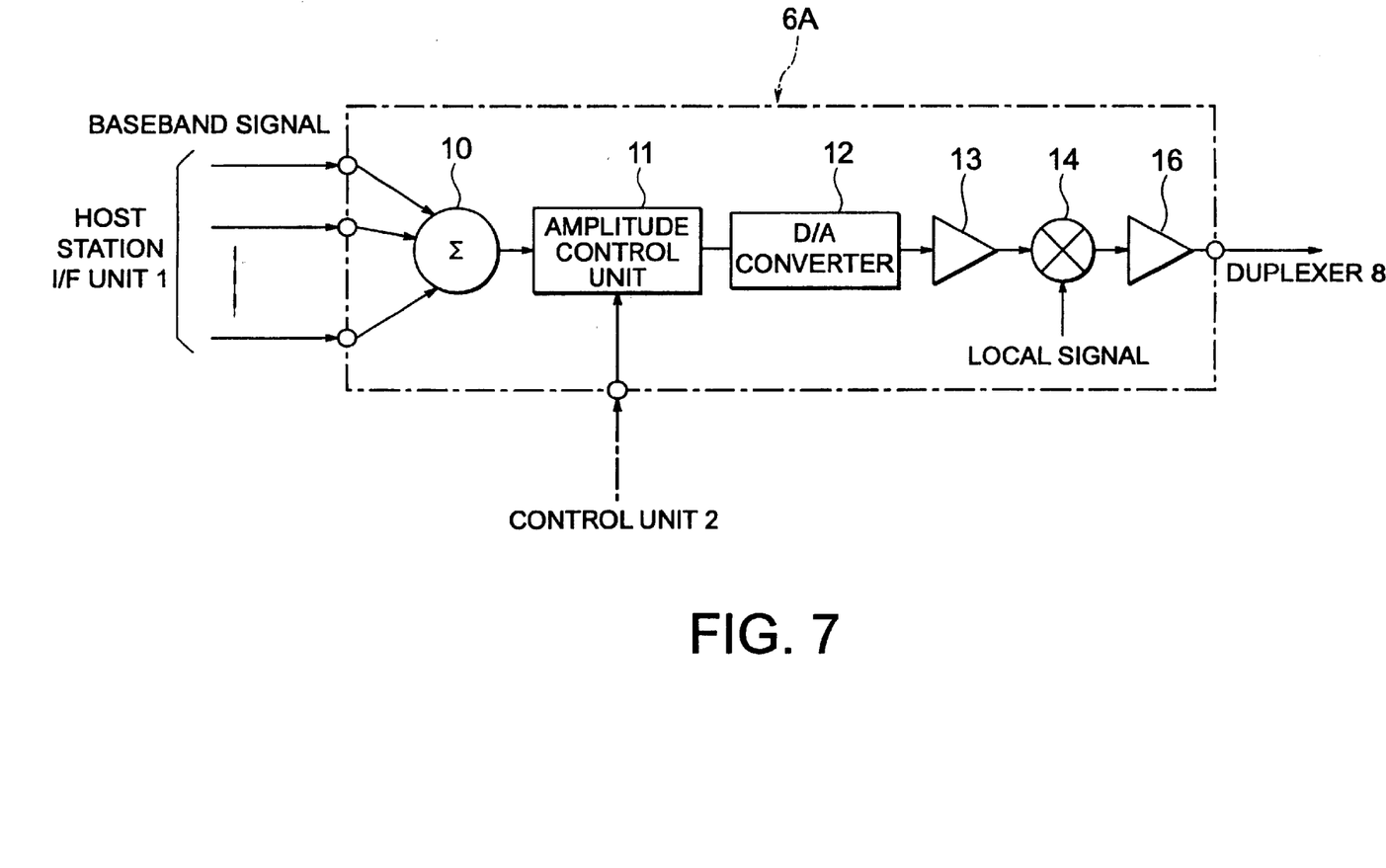
FIG. 7 shows a detailed configuration of an another example of a sending unit shown in FIG. 5.

In FIG. 7, the sending unit 6A is shown, which is modified by the sending unit 6 shown in FIG. 6.

In the illustrated sending unit 6A, an amplitude control unit 11 is included together with the adder 10, the D/A converter 12 and, the amplifier 13, the modulator 14, and the power amplifier 16 and is located between the adder 10 and the D/A converter 12.

The adder 10 sums up a plurality of primary modulated signals sent from the base band processing units $3_1, 3_2, \ldots, 3_N$ to produce a summed primary modulated signal. The amplitude control unit 11 gradually reduces the level of electric power of the summed primary modulated signal sent from the adder 10 based on a control signal sent from the control unit 2 (in a stepwise or a continuous manner). The D/A converter 12 converts the summed primary modulated signal sent from the amplitude control unit 11 into an analog signal. The amplifier 13 amplifies the analog signal sent from the D/A converter 12 (the primary modulated signal/the baseband signal) into an amplified analog signal. The modulator 14 mixes the amplified analog signal sent from the amplifier 13 with a local signal (spread code signal) to produce a spread signal. The power amplifier 16 amplifies electric power of the spread signal to a predetermined level and sends the signal to the duplexer 8.

Next, returning to FIG. 5, operation of the embodiment of the invention is described.

The base station shown in FIG. 5 is used in a cellular mobile CDMA communication system and performs a procedure (a sequence of communication processes) of controlling transmission electric power based on the standard IS-95-A of TIA/EAI.

At first, the host station interface unit 1 interfaces with the host stations. Then, the control unit 2 gradually reduces transmission electric power and performs soft handoff deletion procedure for the base station when the base station stops transmission due to its maintenance. As a result, controlling transmission electric power is performed so that a disconnection may not be caused to occur between the mobile station and the radio network even when the base station which is communicating with the mobile station is put into an inactive state by interrupting transmission for maintenance.

Further, each of the baseband processing units $3_1, 3_2, \ldots, 3_N$ sends, to the sending unit 6, a primary modulated signal which is produced by obtaining a carrier by primary modulated data sent from the host station interface unit 1. On the other hand, each baseband processing unit $3_1, 3_2, \ldots, 3_N$ provides receiving data which is produced by demodulating primary demodulated signal sent from a receiving unit 7.

Furthermore, the sending unit 6 controls transmission electric power under control of the control unit 2 when the base station is under maintenance, and sends a spread signal to a mobile station (not shown) via the duplexer 8 and the antenna 9.

The receiving unit 7 receives a reception data signal from the mobile station via the antenna 9 and the duplexer 8, despreads the reception data signal into a despread signal by the use of a reference spread code signal, and sends an objective primary demodulated signal to the baseband processing units $3_1, 3_2, \ldots, 3_N$.

Next, operation of the sending unit 6 is described with reference to FIG. 6. In the sending unit 6, the adder 10 sums up the primary modulated signals sent from the baseband processing units $3_1, 3_2, \ldots, 3_N$, to produce a summed primary modulated signal and the D/A converter 12 converts the signal into an analog signal which carries the summed primary modulated signal. Then the amplifier 13 amplifies the analog signal (the summed primary modulated signal) into an amplified analog signal. Thereafter, the modulator 14 mixes the amplified primary modulated signal with a local signal (the spread code signal) to produce the spread signal. The variable attenuator 15 gradually or slowly attenuates the spread signal sent from the modulator 14 under control of the control unit 2, and consequently stops transmission.

That is, when the base station stops transmission due to its maintenance, the base station controls transmission electric power. Specifically, the base station controls the transmission electric power. In this event, the base station gradually or slowly reduces the transmission electric power and performs soft handoff deletion procedure for the base station and soft handoff addition procedure for a new base station, until transmission is completely stopped. Namely, a duration time from a start of the reduction of the electric power to a stop of transmission is desirably controlled less than a period of execution time of the soft handoff addition procedure and the soft handoff deletion procedure.

During the soft handoff deletion procedure and the soft handoff addition procedure, no disconnection of a radio network takes place between the mobile station which is communicating with the base station and each of the base station and between the mobile station and the neighboring base stations. And then, the attenuated and modulated signal from the variable attenuator 15 is amplified to a predetermined level of electric power by the power amplifier 16, and the amplified modulated signal is transferred to the mobile station via the duplexer 8 and the antenna 9.

Next, description will be made about operation of the sending unit 6 shown in FIG. 7. The sending unit 6A is also operable in a manner similar to the sending unit 6 shown in FIG. 6. In the sending unit 6A, the adder 10 sums up the primary modulated signals sent from the baseband processing units $3_1, 3_2, \ldots, 3_N$, and the amplitude control unit 11 controls or gradually reduces the amplitude (level) of the summed primary modulated signal in accordance with a control signal sent from the control unit 2. As a result, a controlled primary modulated signal is sent from the amplitude control unit 11 to the D/A converter 12.

The D/A converter 12 converts the controlled primary modulated signal into an analog signal. Then the amplifier 13 amplifies the analog signal (which carries the controlled primary modulated signal/baseband signal) into an amplified primary modulated signal, and the modulator 14 mixes the amplified primary modulated signal with a local signal[s] (spread code signal) to produce the spread signal.

Next, the power amplifier 16 amplifies the spread signal sent from the modulator 14 to a predetermined level of electric power and the amplified signal is transferred to the mobile station via the duplexer 8 and the antenna 9.

That is, when the base station stops transmission due to its maintenance, the base station controls transmission electric power. Specifically, the base station controls the transmission electric power. In this event, the base station gradually or slowly reduces the transmission electric power and performs soft handoff deletion procedure for the base station and soft handoff addition procedure for a new base station, until transmission is completely stopped. During the soft handoff procedure and the soft hand off addition procedure, no disconnection of a radio network takes place between the mobile station which is communicating with the base station and each of the base station and between the mobile station and the neighboring base stations.

Now, description is made about control of electric power of the embodiment of the invention. In order simplify the description, it is assumed that there are two base station (A and B) and a mobile station. The soft handoff addition procedure is performed for a plurality of base stations. Similarly, the soft handoff deletion procedure is performed for a plurality of base stations.

Figure 8:
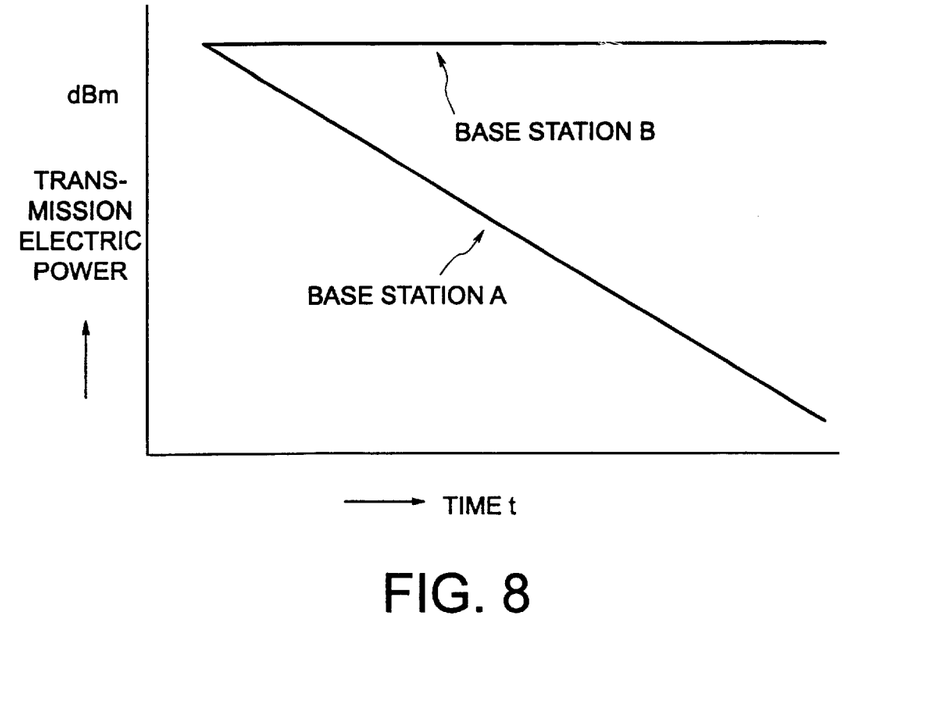
FIG. 8 shows transitions of transmission electric power of a base station in the embodiment of the invention.
Figure 9:
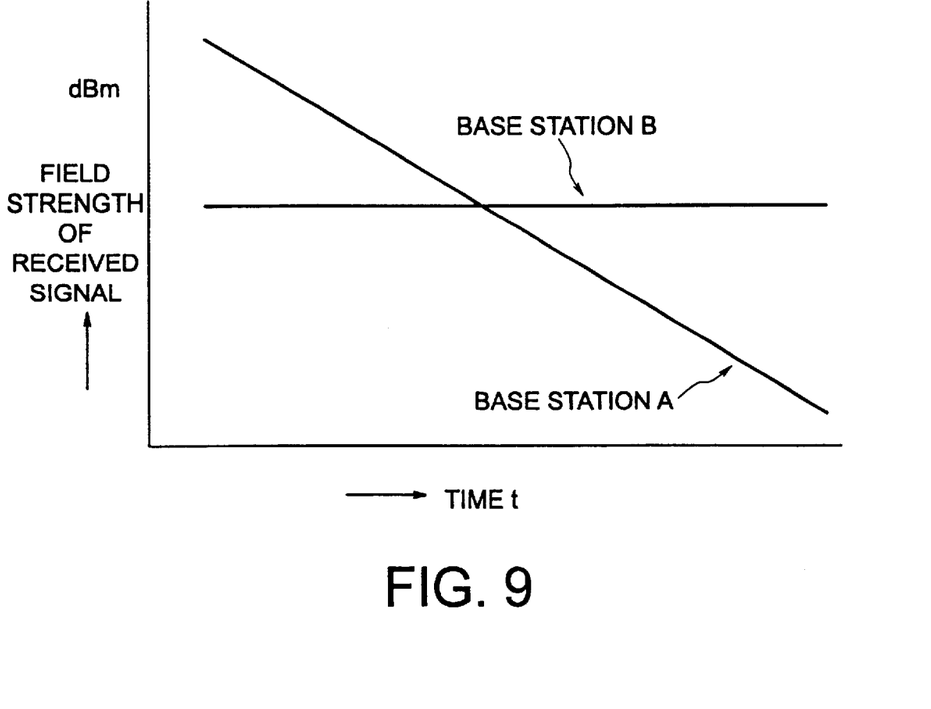
FIG. 9 shows transitions of electric field strength received at a mobile station from base stations in the embodiment of the invention.

As shown in FIG. 8, transmission electric power of the base station A is not suddenly stopped but is gradually reduced when the base station A is about to cease transmitting a pilot signal. In this case, each electric field strength received at a mobile station from the base stations A and B makes transition in a manner as shown in FIG. 9. As a result, Ec/Io ratios of the pilot signals of the base stations A and B are varied as shown in FIG. 10.

Figure 10:
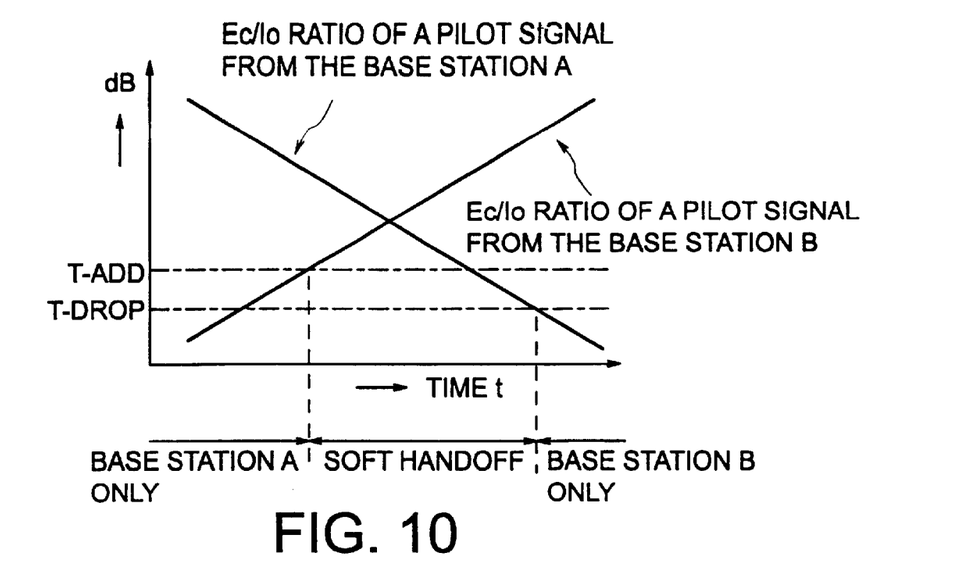
FIG. 10 shows Ec/Io ratios of pilot signals received at a mobile station from base stations in the embodiment of the invention.

As shown in FIG. 10, it is assumed that the mobile station A can detect the pilot signal sent from the base station B even when electric power of the base station A is reduced to a degree. If the base station A further reduces electric power, the base station B can increase the Ec/Io ratio of the pilot signal. When the Ec/Io ratio of the pilot signal of the base station B increases and exceeds the threshold value T-ADD for determining whether the soft handoff addition procedure is carried out or not, the mobile station B performs the soft handoff addition procedure in a manner similar to the procedure described with reference to FIG. 1.

Next, description is made in detail about a sequence of the soft handoff addition procedure.

At first, when an Ec/Io ratio of the pilot signal from the neighboring service areas exceeds the threshold value T-ADD, the mobile station transmits the electric field strength measurement message of the reception pilot signal. The message may include, for example, the number of base stations in which the soft handoff procedure is initialized and, as a result, the soft handoff addition procedure is performed. When the base station A receives the message, the base station A instructs the mobile station to add the base station B as an object of the soft handoff procedure using a soft handoff instruction message. When the mobile station receives the instruction message, the mobile station adds the base station B as an object of the soft handoff and transfers a soft handoff completion message to the base station A. Thus, the procedure has been completed in the mobile station.

Furthermore, as shown in FIG. 10, when transmission electric power of the base station A is reduced, the Ec/Io ratio of the pilot signal at the mobile station from the base station A is still reduced and is lowered under a threshold value T-DROP for determining whether the soft handoff deletion procedure must be carried out or not. As a result, the mobile station A performs the soft handoff deletion procedure.

Figure 11:
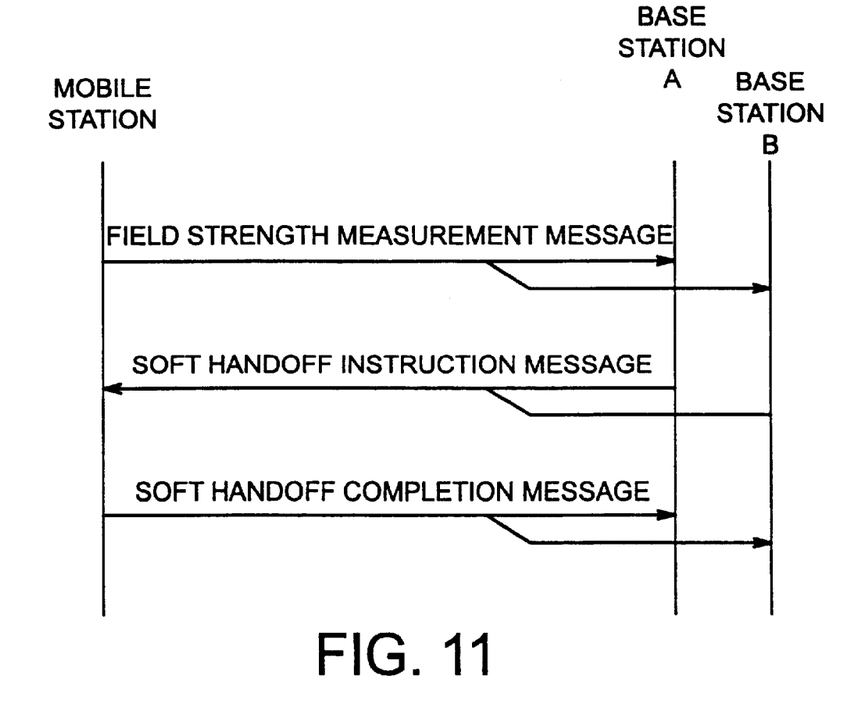
FIG. 11 shows a sequence of soft handoff deletion procedure in the embodiment of the invention.

According to the soft handoff deletion procedure shown in FIG. 11, at first, the mobile station transfers the electric field strength measurement message of the reception pilot signal to the base stations A and B, when the Ec/Io ratio is lowered under the T-DROP in the reception pilot signal sent from the base station A, which is communicating with the mobile station.

Responsive to the message, the base stations A and B transfer instruction messages to the mobile station to disconnect from the base station A by using a soft handoff instruction message. Then, when the mobile station receives the instruction message, the mobile station transfers a soft handoff completion message to the base stations A and B. After this transfer, the mobile station is disconnected from the base stations A and connected to only the base station B. At this point, the procedure has been completed.

As described above, when the base station stops transmission due to its maintenance, the base station controls transmission electric power. Specifically, the base station controls the transmission electric power. In this event, the base station gradually or slowly reduces the transmission electric power and performs soft handoff deletion procedure for the base station and soft handoff addition procedure for a new base station, until transmission is completely stopped. During the soft handoff deletion procedure and the soft handoff addition procedure, no disconnection of a radio network takes place between the mobile station which is communicating with the base station and each of the base station and between the mobile station and the neighboring base stations.

Therefore, according to the invention, when the specified base station stops transmission, the base station gradually reduces transmission electric power and consequently slowly stops transmission. Further, until transmission is completely stopped, the soft handoff deletion procedure is carried out for the stopping base station and the soft handoff addition procedure is carried out for the other neighboring base station or stations.

What is claimed is:

1. A method of controlling transmission electric power in a first base station communicating with a mobile station, the method comprising the steps of:

adding, at the first base station, a plurality of primary modulated signals sent from a host station;

converting the added plurality of primary modulated signals into an analog signal;

amplifying the analog signal;

multiplying the amplified analog signal of the plurality of modulated signals by a spread code signal to produce a spread signal;

amplifying the spread signal;

gradually reducing the transmission electric power and consequently stopping transmission in the first base station; and performing soft handoff deletion procedure for the first base station and soft handoff addition procedure for second base stations without disconnection between the mobile station, the first base station and the second base stations.

2. The method claimed in claim 1, wherein the soft handoff addition procedure comprises the steps of:

selecting, at the mobile station, a specific base station among the second base station, when an Ec/Io ratio of a pilot signal which is sent from the specific base station and received by the mobile station exceeds a predetermined first threshold value;

sending, from the mobile station, a measurement message to the second base stations;

sending, from the second base stations, a soft handoff instruction message to the mobile station in response to the measurement message;

performing, at the mobile station, soft handoff addition for the second base stations; and sending, from the mobile station, a completion message to the second base station when the performing step is completed.

3. The method claimed in claim 1, wherein the soft handoff deletion procedure comprises the steps of:

sending, from the mobile station, a measurement message to the first base stations when an Ec/Io ratio of a pilot signal which is sent from the first base station and received by the mobile station is lowered under a predetermined second threshold value;

sending, from the first base stations, a soft handoff instruction message to the mobile station in response to the measurement message;

performing, at the mobile station, soft handoff deletion for the second base stations; and sending, from the mobile station, a complete message to the first base station when the performing step is completed.

4. The method claimed in claim 1, wherein the gradually reducing transmission electric power is performed in a stepwise or a continuous manner.

5. The method claimed in claim 1, further comprising the step of stopping transmission in the first base station due to its maintenance.

6. The method claimed in claim 1, wherein the mobile station, the first base station, and the second base stations form a CDMA system.

7. The method claimed in claim 1, wherein the soft handoff addition procedure and the soft handoff deletion procedure are performed based on the standard Is-95-A of TIA/EAI.

8. The method of claim 1, wherein gradually reducing the transmission electric power and consequently stopping transmission in the first base station comprises attenuating the spread signal based on a control signal sent from a control unit before the spread signal is amplified.

9. The method of claim 1, wherein gradually reducing the transmission electric power and consequently stopping transmission in the first base station comprises reducing the amplitude of the added plurality of primary modulated signals based on a control signal sent from a control unit before the added plurality of primary modulated signals is converted.

10. A computer readable medium which stores a program operable for controlling transmission electric power in a first base station communicating with a mobile station, the program comprising the steps of:

adding, at the first base station, a plurality of primary modulated signals sent from a host station;

converting the added plurality of primary modulated signals into an analog signal;

amplifying the analog signal;

multiplying the amplified analog signal of the plurality of modulated signals by a spread code signal to produce a spread signal;

amplifying the spread signal;

gradually reducing the transmission electric power and consequently stopping transmission in the first base station; and performing soft handoff deletion procedure for first base station and soft handoff addition procedure for second base stations without disconnection of radio networks between the mobile station, the first base station and the second base stations.

11. A control system which controls transmission electric power, the system comprising:

a first base station which gradually reduces transmission electric power of itself and consequently stops transmission; and a mobile station which communicates with the first base station and performs soft handoff deletion procedure for the first base station and soft handoff addition procedure for second base stations without disconnection between the mobile station and selected one of the first base station and the second base stations;

wherein each of the first base station and the second base stations comprises:

a host station interface unit which interfaces with a host station;

a control unit which gradually reduces transmission electric power of itself and consequently stops transmission;

a baseband processing unit which outputs a primary modulated signal which is produced from sending data sent from the host station interface unit by performing primary modulation using a carrier, and outputs receiving data which are produced using a primary demodulated signal received;

a sending unit which sends a signal based on electric power which is controlled by the control unit;

a receiving unit which receives a signal from the mobile station, detects correlation using a reference spread code signal, and outputs an objective primary demodulated signal;

a duplexer which outputs a signal from the sending unit and outputs a receiving signal to the receiving unit; and an antenna which is connected to the duplexer;

wherein the sending unit further comprises;

An adder which sums up a plurality of primary modulated signals sent from the host station interface unit;

a D/A converter which converts the primary modulated signal from the adder into an analog signal;

an amplifier which amplifies the primary modulated analog signal sent from the D/A converter;

a modulator which multiples the primary modulated signal from the amplifier by a speed code signal to produce a spread signal;

a variable attenuator which attenuates the spread signal sent from the modulator in a stepwise or a continuous manner based on a control signal sent from the control unit; and a power amplifier which amplifies the spread signal sent from the variable attenuator to a predetermined level of electric power and sends the spread signal to the duplexer.

12. The control system claimed in claim 11, wherein a duration time from a start of the reduction of the electric power to a stop of transmission is controlled less than a period of execution time of the soft handoff addition procedure and the soft handoff deletion procedure.

13. The control system claimed in claim 9, wherein the system is a CDMA system.

14. A control system which controls transmission electric power, the system comprising:

a first base station which gradually reduces transmission electric power of itself and consequently stops transmission; and a mobile station which communicates with the first base station and performs soft handoff deletion procedure for the first base station and soft handoff addition procedure for second base stations without disconnection between the mobile station and selected one of the first base station and the second base stations;

wherein each of the first base station and the second base station comprises:
- a host station interface unit which interfaces with a host station;
- a control unit which gradually reduces transmission electric power of itself and consequently stops transmission;
- a baseband processing unit which outputs a primary modulated signal which is produced from sending data sent from the host station interface unit by performing primary modulation using a carrier, and outputs receiving data which are produced using a primary demodulated signal received;
- a sending unit which sends a signal based on electric power which is controlled by the control unit;
- a receiving unit which receives a signal from the mobile station, detects correlation using a reference spread code signal, and outputs an objective primary demodulated signal;
- a duplexer which outputs a signal from the sending unit and outputs a receiving signal to the receiving unit; and
- an antenna which is connected to the duplexer;

wherein the sending unit further comprises:
- an adder which sums up a plurality of primary modulated signals sent from the host station interface unit;
- an amplitude control unit which reduces an amplitude of the primary modulated signal sent from the adder in a stepwise or a continuous manner based on a control signal sent from the control unit;
- a D/A converter which converts the primary modulated signal from the amplitude control unit into an analog signal;
- an amplifier which amplifies the primary modulated analog signal sent from the D/A converter;
- a modulator which multiplies the primary modulated signal from the amplifier by a spread code signal to produce a spread signal; and
- a power amplifier which amplifies the spread signal sent from the modulator to a predetermined level of electric power and sends the spread signal to the duplexer.

15. The control system claimed in claim 14, wherein a duration time from a start of the reduction of the electric power to a stop of transmission is controlled less than a period of execution time of the soft handoff addition procedure and the soft handoff deletion procedure.

16. The control system claimed in claim 14, wherein the system is a CDMA system.

17. A base station comprising:
- a control unit which gradually reduces base station transmission electric power and consequently stops base station transmission; and
- a sending unit which sends a signal based on electric power which is controlled by the control unit, wherein the sending unit includes an adder which sums up a plurality of primary modulated signals sent from the host station interface unit;
- a D/A converter which converts the primary modulated signal from the adder into an analog signal;
- an amplifier which amplifies the primary modulated analog signal sent from the D/A converter;
- a modulator which multiplies the primary modulated signal from the amplifier by a spread code signal to produce a spread signal;
- a variable attenuator which attenuates the spread signal sent from the modulator in a stepwise or a continuous manner based on a control signal sent from the control unit; and
- a power amplifier which amplifies the spread signal sent from the variable attenuator to a predetermined level of electric power and sends the spread signal to the duplexer.

18. The base station claimed in claim 17 further comprising:
- a host station interface unit which interfaces with a host station;
- a baseband processing unit which outputs a primary modulated signal which is produced from sending data sent from the host station interface unit by performing primary modulation using a carrier, and outputs receiving data which are produced using a primary demodulated signal received;
- a receiving unit which receives a signal, detects correlation using a reference spread code signal, and outputs an objective primary demodulated signal;
- a duplexer which outputs a signal from the sending unit and outputs a receiving signal to the receiving signal; and
- an antenna which is connected to the duplexer.

19. A base station comprising:
- a control unit which gradually reduces base station transmission electric power and consequently stops base station transmission; and
- a sending unit which sends a signal based on electric power which is controlled by the control unit, wherein the sending unit includes an adder which sums up a plurality of primary modulated signals sent from the host station interface unit;
- an amplitude control unit which reduces an amplitude of the primary modulated signal sent from the adder in a stepwise or a continuous manner based on a control signal sent from the control unit;
- a D/A converter which converts the primary modulated signal from the amplitude control unit into an analog signal;
- an amplifier which amplifies the primary modulated analog signal sent from the D/A converter;
- a modulator which multiplies the primary modulated signal from the amplifier by a spread code signal to produce a spread signal; and
- a power amplifier which amplifies the spread signal sent from the modulator to a predetermined level of electric power and sends the spread signal to the duplexer.

20. The base station claimed in claim 19 further comprising:
- a host station interface unit which interfaces with a host station;
- a baseband processing unit which outputs a primary modulated signal which is produced from sending data sent from the host station interface unit by performing primary modulation using a carrier, and outputs receiving data which are produced using a primary demodulated signal received;
- a receiving unit which receives a signal, detects correlation using a reference spread code signal, and outputs an objective primary demodulated signal;
- a duplexer which outputs a signal from the sending unit and outputs a receiving signal to the receiving signal; and
- an antenna which is connected to the duplexer.

* * * * *